UNITED STATES PATENT OFFICE.

JAMES MADISON BROWN, OF JOHNSON CITY, TENNESSEE.

SMOKELESS POWDER AND PROCESS OF MAKING SAME.

1,222,065. Specification of Letters Patent. Patented Apr. 10, 1917.

No Drawing. Application filed March 4, 1915. Serial No. 12,024.

*To all whom it may concern:*

Be it known that I, JAMES MADISON BROWN, a citizen of the United States, residing at Johnson City, in the county of Washington and State of Tennessee, have invented certain new and useful Improvements in Smokeless Powder and Processes of Making Same; and I do hereby declare the following to be a full, clear, and exact description of the invention, such as will enable others skilled in the art to which it appertains to make and use the same.

This invention relates to a smokeless high powered powder, as well as to the process of making the same, and has for its object to provide a method which will produce a product that will be safe in use, as well as one that will require less time in its manufacture than has heretofore been proposed.

With these and other objects in view, the invention consists in the novel composition of matter, as well as in the novel steps and combinations of steps constituting the process, all as will be more fully hereinafter disclosed and particularly pointed out in the claims.

In carrying out this process I prefer to employ from say 8% to 16% by weight of a varnish like mixture composed of boiled linseed oil and commercial rosin; about, say, 60% to 70% of ammonium perchlorate; about, say 5% to 10% of sulfur; and, about, say 23% of a finely divided carbohydrate such as grain flour.

When the other ingredients are varied, of course, the carbohydrate or grain flour must be correspondingly varied. In such cases amounts of said carbohydrate or of grain flour will be used all the way from 27% to 14%.

In making up the varnish like material I have found a convenient method consists in heating the rosin to say 160° C. and pouring the oil in on the heated rosin, when if the mixture is thoroughly stirred the rosin will substantially dissolve in the oil thus producing a varnish like solution. I find it convenient to use say one and one half parts by weight of rosin to one part by weight of oil in order to produce a substantially saturated solution.

I next add the finely divided, or powdered, ammonium perchlorate which may be conveniently ground to pass, say, an 80 mesh screen, and I thoroughly incorporate the said perchlorate with the varnish as by a stirring or kneading action. The solution thereupon thoroughly coats each individual grain of perchlorate and therefore prevents them from absorbing moisture. The sulfur may now be thoroughly incorporated into the mass thus produced as by a kneading action, whereupon the flour or other finely divided carbohydrate may be added, and the whole thoroughly mixed, when the mass will consist largely of individual grains having the appearance of being moist, although no water has been added thereto.

This mass is next subjected to pressure by any suitable means, as for example, by a suitable press, to form it into cakes, or into other suitable shapes.

After the cakes, or other shapes, have been produced, they may be dried, at say 90° C., for about four hours, whereupon they begin to harden, and they may be further dried at room temperature for say about eighteen or twenty hours, when they will be found to be of a hard cement like character, and to be capable of being readily cracked into grains for use.

The grains thus produced may be sorted to size in any suitable manner and immediately used for rifle or other powders.

The powder thus produced will be found to be a free running powder when subjected to a temperature as high as say 70° C.; it is not sensitive to moisture; it is not sensitive to impact; and it is found to be smokeless when fired from a gun.

Special advantages of this powder are found in the fact that it may be produced ready for use in say 24 hours, and in the fact that all its products are gaseous and therefore no deposit is left in the gun. The chief functions of the rosin and oil solution are the coating of the individual grains to protect them from moisture, and to cause the mass to be brittle, thereby facilitating the cracking of the same into individual grains. It therefore follows that if too little rosin is used it would take a longer time for the mass to harden sufficiently, and if a greater proportion of rosin is employed difficulty would be found in getting it to dissolve in the oil. The chief function of the sulfur employed is to render the powder more sensitive to ignition and thereby to permit the ordinary service primers to be used.

The proportions of parts above mentioned may of course be varied, but I prefer to use about 12% of the said varnish like mixture, about 5% of sulfur, about 60% of the ammonium perchlorate and about 23% of wheat flour.

When the above proportions are employed the gases of explosion will be found to consist almost entirely of carbon monoxid mixed with a small quantity of carbon dioxid. The ammonium chlorid formed is ejected as a gas, and the hydrogen and oxygen in the flour is probably emitted in the form of water. I prefer to employ a grain flour instead of carbon for the reason that it requires less oxygen to consume it.

An important advantage of the use of an alkali perchlorate, such as potassium, sodium or ammonium perchlorates, over the corresponding chlorates resides in the fact that the perchlorate powder is not sensitive to shock, and it can be used in mines as a blasting powder, or in other places in contact with sulfur, or sulfids, without unduly increasing its sensitiveness, thereby avoiding accidental explosions.

This powder can be conveniently used as a blasting powder before it is cracked into grains, or it can be so used after it is cracked into grains. In making rifle powder those grains which are not of a suitable size can also be used as a blasting powder. Its constituents being capable of production on a commercial scale at comparatively low costs, this powder can even compete with dynamite for many uses.

It is obvious that those skilled in the art may vary the details of the process, as well as the composition of the powder, without departing from the spirit of my invention, and, therefore, I do not wish to be limited to the above disclosure except as may be required by the claims.

What I claim is:

1. The process of making smokeless powder which consists in preparing a solution of from 8% to 16% of rosin and linseed oil; mixing over 59% of ammonium perchlorate with said solution; adding about 5% to 10% sulfur to said mixture; adding substantially 27% to 14% of a finely divided carbohydrate to the mixture and suitably forming the mass into grains, substantially as described.

2. The process of producing a smokeless powder which consists in preparing a solution consisting of from 8% to 12% rosin and boiled linseed oil; mixing substantially 60% ammonium perchlorate in said solution; adding from 5% to 10% sulfur to the mixture; and adding substantially 27% to 18% of grain flour to the mass thus produced, substantially as described.

3. The process of producing a smokeless powder which consists in preparing a solution consisting of 12% of a solution of rosin and boiled linseed oil; mixing 60% ammonium perchlorate in said solution; adding 5% sulfur to said mixture; and adding 23% grain flour to the mass thus produced, substantially as described.

4. The herein described new smokeless powder consisting of a mixture of finely divided ammonium perchlorate, sulfur, and grain flour bound together by a coating consisting of rosin and linseed oil, substantially as described.

In testimony whereof I affix my signature in presence of two witnesses.

JAMES MADISON BROWN.

Witnesses:
T. A. WITHERSPOON,
C. W. FOWLER.